US008459353B2

United States Patent
Hughes et al.

(10) Patent No.: US 8,459,353 B2
(45) Date of Patent: Jun. 11, 2013

(54) DELIVERY OF PARTICULATE MATERIAL BELOW GROUND

(75) Inventors: Trevor Hughes, Cambridge (GB); Evgeny Barmatov, Cambridge (GB); Jill Geddes, Cambridge (GB); Michael Fuller, Houston, TX (US); Bruno Drochon, Cambridge (GB); Sergey Makarychev-Mikhailov, St. Petersburg (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 350 days.

(21) Appl. No.: 12/868,165

(22) Filed: Aug. 25, 2010

(65) Prior Publication Data

US 2012/0048557 A1    Mar. 1, 2012

(51) Int. Cl.
*E21B 43/25*    (2006.01)
*E21B 43/267*    (2006.01)
*C09K 8/80*    (2006.01)
*C09K 8/92*    (2006.01)

(52) U.S. Cl.
USPC ............... 166/280.2; 166/280.1; 166/300; 166/305.1; 166/308.2; 166/308.3; 507/202; 507/901; 507/904

(58) Field of Classification Search
USPC .......................................................... 507/901
See application file for complete search history.

(56) References Cited

U.S. PATENT DOCUMENTS

| | | | |
|---|---|---|---|
| 2,729,426 A * | 1/1956 | Smith | 175/68 |
| 2,729,469 A | 1/1956 | Wilson | |
| 3,462,242 A * | 8/1969 | Robinson et al. | 423/185 |
| 3,850,247 A | 11/1974 | Tinsley | |
| 3,951,824 A * | 4/1976 | Maxson et al. | 507/127 |

(Continued)

FOREIGN PATENT DOCUMENTS

| | | |
|---|---|---|
| CA | 1071076 | 2/1980 |
| WO | WO0212674 A1 | 2/2002 |

(Continued)

OTHER PUBLICATIONS

American Petroleum Institute: "Recommended practices for testing high-strength proppants used in hydraulic fracturing operations", API Recommended Practice 60, Second Edition, Dec. 1995, pp. 1-15.

(Continued)

*Primary Examiner* — George Suchfield
(74) *Attorney, Agent, or Firm* — Daryl R. Wright; Rachel Greene; Robin Nava

(57) ABSTRACT

A wellbore fluid is an aqueous carrier liquid with first and second hydrophobic particulate materials suspended therein. The first hydrophobic particles have a higher specific gravity than the second hydrophobic particles and the fluid also comprises a gas to wet the surface of the particles and bind them together as agglomerates. The fluid may be a fracturing fluid or gravel packing fluid and the first particulate material may be proppant or gravel. The lighter second particulate material and the gas both reduce the density of the agglomerates which form so that they settle more slowly from the fluid, or are buoyant and do not settle. This facilitates transport and placement in a hydraulic fracture or gravel pack. One application of this is when fracturing a gas-shale with slickwater. The benefit of reduced settling is better placement of proppant so that a greater amount of the fracture is propped open.

16 Claims, 3 Drawing Sheets

U.S. PATENT DOCUMENTS

| | | | |
|---|---|---|---|
| 4,439,328 A * | 3/1984 | Moity | 507/204 |
| 4,493,875 A | 1/1985 | Beck et al. | |
| 4,547,468 A | 10/1985 | Jones et al. | |
| 4,553,595 A | 11/1985 | Huang et al. | |
| 4,600,057 A | 7/1986 | Borchardt | |
| 4,611,664 A | 9/1986 | Osterhoudt, III et al. | |
| 4,623,783 A | 11/1986 | Kondo | |
| 4,657,784 A | 4/1987 | Olson | |
| 4,767,549 A * | 8/1988 | McEwen et al. | 507/131 |
| 4,986,354 A | 1/1991 | Cantu et al. | |
| 5,040,601 A | 8/1991 | Karlsson et al. | |
| 5,368,051 A | 11/1994 | Dunn et al. | |
| 5,439,057 A | 8/1995 | Weaver et al. | |
| 5,505,740 A | 4/1996 | Kong et al. | |
| 5,658,881 A | 8/1997 | Gelland et al. | |
| 5,680,900 A | 10/1997 | Nguyen et al. | |
| 5,716,923 A | 2/1998 | MacBeath | |
| 5,910,322 A | 6/1999 | Rivett et al. | |
| 5,922,652 A | 7/1999 | Kowalski et al. | |
| 6,156,808 A * | 12/2000 | Chatterji et al. | 516/116 |
| 6,176,537 B1 | 1/2001 | Doshi | |
| 6,253,851 B1 | 7/2001 | Schroeder, Jr. et al. | |
| 6,655,475 B1 | 12/2003 | Wald | |
| 6,684,760 B1 | 2/2004 | Rajusth | |
| 6,725,929 B2 | 4/2004 | Bissonnette et al. | |
| 6,725,931 B2 | 4/2004 | Nguyen et al. | |
| 6,774,094 B2 | 8/2004 | Jovancicevic et al. | |
| 6,776,235 B1 | 8/2004 | England | |
| 6,814,145 B2 | 11/2004 | Maberry et al. | |
| 6,884,760 B1 * | 4/2005 | Brand et al. | 507/140 |
| 7,017,664 B2 | 3/2006 | Walker et al. | |
| 7,036,585 B2 | 5/2006 | Zhou et al. | |
| 7,160,844 B2 | 1/2007 | Urbanek | |
| 7,166,560 B2 | 1/2007 | Still et al. | |
| 7,204,312 B2 | 4/2007 | Roddy et al. | |
| 7,210,528 B1 | 5/2007 | Brannon et al. | |
| 7,213,651 B2 | 5/2007 | Brannon et al. | |
| 7,219,731 B2 | 5/2007 | Sullivan et al. | |
| 7,228,912 B2 | 6/2007 | Patel et al. | |
| 7,273,104 B2 | 9/2007 | Wilkinson | |
| 7,281,580 B2 | 10/2007 | Parker et al. | |
| 7,281,581 B2 | 10/2007 | Nguyen et al. | |
| 7,287,586 B2 | 10/2007 | Everett et al. | |
| 7,287,588 B2 | 10/2007 | Zaroslov et al. | |
| 7,325,608 B2 | 2/2008 | van Batenburg et al. | |
| 7,331,390 B2 | 2/2008 | Eoff et al. | |
| 7,380,600 B2 | 6/2008 | Willberg et al. | |
| 7,380,601 B2 | 6/2008 | Willberg et al. | |
| 7,392,847 B2 | 7/2008 | Gatlin et al. | |
| 7,407,007 B2 | 8/2008 | Tibbles | |
| 7,417,504 B2 | 8/2008 | Strydom et al. | |
| 7,419,737 B2 | 9/2008 | Oh et al. | |
| 7,461,696 B2 | 12/2008 | Nguyen et al. | |
| 7,472,751 B2 | 1/2009 | Brannon et al. | |
| 7,484,564 B2 | 2/2009 | Welton et al. | |
| 7,491,444 B2 | 2/2009 | Smith et al. | |
| 7,581,780 B2 | 9/2009 | Shimamura et al. | |
| 7,665,522 B2 * | 2/2010 | Sullivan et al. | 166/300 |
| 7,723,274 B2 | 5/2010 | Zhang | |
| 7,918,277 B2 | 4/2011 | Brannon et al. | |
| 7,919,183 B2 | 4/2011 | McDaniel et al. | |
| 7,921,911 B2 | 4/2011 | Fuller et al. | |
| 8,127,850 B2 | 3/2012 | Brannon et al. | |
| 2004/0014607 A1 | 1/2004 | Sinclair et al. | |
| 2004/0055747 A1* | 3/2004 | Lee | 166/278 |
| 2004/0238173 A1 | 12/2004 | Bissonnette et al. | |
| 2005/0167104 A1 | 8/2005 | Roddy et al. | |
| 2005/0244641 A1 | 11/2005 | Vincent | |
| 2005/0274517 A1 | 12/2005 | Blauch et al. | |
| 2006/0016598 A1 | 1/2006 | Urbanek | |
| 2006/0048943 A1 | 3/2006 | Parker et al. | |
| 2006/0054324 A1 * | 3/2006 | Sullivan et al. | 166/308.1 |
| 2006/0166838 A1 | 7/2006 | Collins et al. | |
| 2007/0015669 A1 * | 1/2007 | Zhang | 507/200 |
| 2007/0044965 A1 | 3/2007 | Middaugh | |
| 2008/0000638 A1 | 1/2008 | Burukhin et al. | |
| 2008/0023203 A1 | 1/2008 | Steiner | |
| 2008/0032898 A1 | 2/2008 | Brannon et al. | |
| 2008/0135242 A1 | 6/2008 | Lesko et al. | |
| 2008/0156498 A1 | 7/2008 | Phi et al. | |
| 2008/0217010 A1 | 9/2008 | Blackburn et al. | |
| 2008/0277115 A1 | 11/2008 | Rediger et al. | |
| 2008/0296204 A1 | 12/2008 | Venkateshan | |
| 2009/0038797 A1 | 2/2009 | Skala et al. | |
| 2009/0107674 A1 | 4/2009 | Brannon et al. | |
| 2009/0137433 A1 | 5/2009 | Smith et al. | |
| 2009/0188718 A1 | 7/2009 | Kageson-Loe et al. | |
| 2010/0018709 A1 | 1/2010 | Parlar et al. | |
| 2010/0163234 A1 | 7/2010 | Fuller et al. | |
| 2010/0256024 A1* | 10/2010 | Zhang | 507/219 |
| 2010/0267593 A1* | 10/2010 | Zhang | 507/219 |
| 2011/0100634 A1 | 5/2011 | Williamson | |
| 2011/0180260 A1 | 7/2011 | Brannon et al. | |

FOREIGN PATENT DOCUMENTS

| | | |
|---|---|---|
| WO | WO03106809 A1 | 12/2003 |
| WO | WO2004083600 A1 | 9/2004 |
| WO | WO2005100007 A1 | 10/2005 |
| WO | WO2007086771 A1 | 8/2007 |
| WO | WO2008068645 A1 | 6/2008 |
| WO | WO2008102122 A1 | 8/2008 |
| WO | WO2008124919 A1 | 10/2008 |
| WO | WO2008131540 A1 | 11/2008 |
| WO | WO2008151447 A1 | 12/2008 |
| WO | WO2009009886 A1 | 1/2009 |
| WO | WO2009076080 A1 | 6/2009 |
| WO | WO2009143998 A1 | 12/2009 |

OTHER PUBLICATIONS

American Petroleum Institute: "Recommended practices for testing sand used in hydraulic fracturing operations", API Recommended Practice 56, Second Edition, Dec. 1995, pp. 1-12.

Armistead et al: "Reactions of Chloromethyl Silanes with Hydrated Aerosil Silicas"; Transactions of the Faraday Society, v. 63, 1967, 2549-2556.

Arukhe et al: "Solutions for better production in tight gas reservoirs through hydraulic fracturing", 2009 SPE Western Regional Meeting, San Jose, California, USA, Mar. 24-28, 2009; SPE Paper 121357.

Aylmore, L. A. G.: "Gas Sorption in Clay Mineral Sysytems"; Clays and Clay Minerals, v. 22, 1974, 175-183.

Beebe et al: "The Determination of Small Surface Areas by.Krypton Adsorption at Low Temperatures"; Journal of the American Chemical Society, v. 67, No. 9, 1554-1558 (1945).

Bereznitski etal:"Characterization of silica-based octyl phases of different bonding density Part I. Thermal stability studies"; Journal of ChromatographyA, v. 828, 1998, 51-58.

Brzoska et al: "Silanization of Solid Substrates: A Step Toward Reproducibility"; Langmuir, v. 10, 1994, 4367-4373.

Capel-Sanchez et al: "Silylation and surface properties of chemically grafted hydrophobic silica"; Journal of Colloid and Interface Science, v. 277, 2004, 146-153.

Capes et al: "A survey of oil agglomeration in wet fine coal processing", Powder Technology, vol. 40, 1984, pp. 43-52.

Chen et al: "Wetting Behaviors of Ethanol/Water on Rough PTFE Surface"; Acta Phys.-Chim. Sin., 2007, 23(8) pp. 1168-1172.

Chung et al: "Hydrophobic modification of silica nanoparticle by using aerosol spray reactor"; Colloids and Surfaces A: Physicochem. Eng. Aspects, v. 236, 2004, 73-79.

Dow Corning Corporation: "Silicone chemistry overview", product information leaflet, pp. 1-11, 1997, form No. 51-960A-97, Dow Corning Corporation, Midland, Michigan 48686-0994.

Drzymala et al: "Air agglomeration of hydrophobic particles", Paper presented at the 34th Annual Conference of Metallurgists, Vancouver, Canada, Aug. 19-24, 1995.

Duchet et al: "Influence of the deposition process on the structure of grafted alkylsilane layers", Langmuir vol. 1997, pp. 2271-2278.

Fadeev et al: "Self-Assembly Is Not the Only Reaction Possible between Alkyltrichlorosilanes and Surfaces:☐ Monomolecular and ligomeric Covalently Attached Layers of Dichloro- and Trichloroalkylsilanes on Silicon"; Langmuir, v. 16, 2000, 7268-7274.

Fox et al: "The spreading of liquids on low energy surfaces. I. Polytetrafluoroethylene", Naval Research Laboratory, Washington DC, Journal of Colloid Science, vol. 5, 1950, pp. 514-531.

Fuller et al: "Diffuse Reflectance Measurements by Infrared Fourier Transform Spectrometry"; Analytical Chemistry, v. 50, No. 13, 1978, 1906-1910.

Gauthier et al: "Study of Grafted Silane Molecules on Silica Surface with an Atomic Force Microscope"; Langmuir, v. 12, 1996, 5126-5137.

Gussoni et al: "Infrared intensities. Use of the CH-stretching band intensity as a tool for evaluating the acidity of hydrogen atoms in hydrocarbons"; Journal of Molecular Structure, v. 521, 2000, 1-18.

Braggs et al: "The Effect of Surface Modification by an Organosilane on the Electrochemical Properties of Kaolinite"; Clays and Clay Minerals, v. 42, No. 2, 1994, 123-136.

Cupola et al:"Resolving created, propped, and Effective Hydraulic Fracture length"; IPTC paper 12147 Dec. 2008.

Pineda et al: "Wash Pipe or no Wash Pipe? That is the Question"; Offshore technology Conference paper OTC16051 May 2004.

Brannon et al: "Large -Scale Laboratory Investigation of the Effects of Proppant and Fracturing-Fluid Properties on Transport"; SPE paper 98005; Feb. 2006.

Bulova et al: "Benefits of the Novel Fiber-laden Low-Viscosity Fluid System in Fracturing Low-Permeability Tight Gas Formations" SPE paper 102956 Sep. 2006.

Dayan et al: "Proppant Transport in Slick-Water Fracturing of Shale-Gas Formations"; SPE paper 125068 Oct. 2009.

Guo et al: "Simulation and Evaluation of Frac and Pack(F&P) Completion in High Permeability Formations"; Petroleum Society: Canadian Institute of Mining, Metallurgy & Petroleum PETSOC paper 2001-055.

Johansson et al: "Adsorption of silane coupling agents onto kaolinite surfaces"; Clay Minerals, v. 34, No. 2, 1999, 239-246.

Rickards et al: High Strength, Ultra-Lightweight Proppant Lends new Dimensiions to Hydraulic Fracturing Applications; SPE paper 84308; Oct. 2003.

Schein et al: "Ultra Lightweight proppants: Their Use and Application in the Barnett Shale"; SPE Paper 90838; Sep. 2004.

Hunter et al: "Effect of esterically bonded agents on the monolayer structure and foamability of nanosilica", Colloids and Surfaces A: Physicochemical and Engineering Aspects, vol. 334, 2009, pp. 181-190.

Ishida et al: "A Fourier-Transform Infrared Spectroscopic Study of the Hydrolytic Stability of Silane Coupling Agents on E-Glass Fibers"; Journal of Polymer Science, v. 18, 1980, 1931-1943.

Kawashima et al: "Some experiments on the effect of contact angle in agglomeration from liquids", Industrial and Engineering Chemistry Fundamentals, vol. 19, 1980, pp. 312-314.

Kundert et al: "Proper evaluation of shale gas reservoirs leads to a more effective hydraulic-fracture stimulation", 2009 SPE Rocky Mountain Petroleum Technology Conference, Denver, Colorado, USA, Apr. 14-16, 2009; SPE Paper 123586.

Kusaka et al: "Two-liquid flotation of fine oxide particles with B-hydroxyquinoline", The Canadian Journal of Chemical Engineering, vol. 77, Feb. 1999, pp. 62-68.

Laskowski et al: "Oil agglomeration and its effect on beneficiation and filtration of low-rank/oxidized coals", International Journal of Mineral Processing, vol. 58, 2000, pp. 237-252.

Liu et al: "Fundamental study of reactive oily-bubble flotation", Minerals Engineering, vol. 15, 2002, pp. 667-676.

Lowell, S.: "Continuous Flow Krypton Adsorption for Low Surface Area Measurements"; Analytical Chemistry, v. 45, No. 8, 1973, 1576-1577.

Marcinko et al: "Hydrolytic Stability of Organic Monolayers Supported on TiO2 and ZrO2"; Langmuir, 2004, v. 20, 2270-2273.

McElwee et al: "Thermal stability of organic monolayers chemically grafted to minerals; Journal of Colloid and Interface Science, v. 285, 2005,551-556.

McGovern et al: "Role of Solvent on the Silanization of Glass with Octadecyltrichlorosilane"; Langmuir, v. 10, 1994, 3607-3614.

Mehrotra et al: "Review of oil agglomeration techniques for processing of fine coals", International Journal of Mineral Processing, vol. 11, 1983, pp. 175-201.

Mirji, S.A.: "Adsorption of octadecyltrichlorosilane on Si(1 0 0)/SiO2 and SBA-15"; Colloids and Surfaces A: Physicochem. Eng. Aspects, v. 289, 2006, 133-140.

Miwa et al: "Effects of the Surface Roughness on Sliding Angles of Water Droplets on Superhydrophobic Surfaces"; Langmuir 2000, 16, 5754-5760.

Nosonovsky et al:"Superhydrophobic surfaces and emerging applications: Non-adhesion, energy, green engineering"; Current Opinion in Colloid & Interface Science 14 (2009) 270-280.

Owen: "Why silicones behave funny", Dow Corning Corporation, pp. 1-11, 2005, form No. 01-3078-01.

Owen: The surface activity of silicones: A short review, Industrial and Engineering Chemistry Product Research and Development, vol. 19, 1980, pp. 97-103.

Ozkan et al: "Comparison of stages in oil agglomeration process of quartz with sodium oleate in the presence of Ca (II) and Mg(II) ions", Journal of Colloid and Interface Science, vol. 329, 2009, pp. 81-88.

Ozkan: "Determination of the critical surface tension of wetting of minerals treated with surfactants by shear flocculation approach", Journal of Colloid and Interface Science, vol. 277, 2004, pp. 437-442.

Parikh et al: "An Intrinsic Relationship between Molecular Structure in Self-Assembled n-Alkylsiloxane Monolayers and Deposition Temperature"; Journal of Physical Chemistry, v. 98, 1994, 7577-7590.

Parker et al: "Bubbles, Cavities, and the Long-Ranged Attraction between Hydrophobic Surfaces"; J. Phys. Chem. 1994,98, pp. 8468-8480.

Qun et al: "The study and application of low-damage and massive hydraulic fracturing technique in tight gas formations with high temperature and high pressure", CIPC/SPE Gas Technology Symposium 2008 Joint Conference, Calgary, Alberta, Canada, Jun. 16-19, 2008; SPE Paper 114303.

Radice et al: "Spectroscopic behaviour, bond properties and charge distribution in methoxy groups in hydrofluoroethers: the effect of neighbouring CF2 group"; Journal of Molecular Structure, Theochem, v. 710, 2004, 151-162.

Rome et al: "Silicone in the oil and gas industry", Dow Corning Corporation, Sep. 2002, ref. No. 26-1139-01.

Rossetti et al: "Rupture energy and wetting behavior of pendular liquid bridges in relation to the spherical agglomeration process", Journal of Colloid and Interface Science, vol. 261 , 2003, pp. 161-169.

Rye, R R: "Transition Temperatures for n-Alkyltrichlorosilane Monolayers"; Langmuir, v. 13, 1997, 2588-2590.

Silberzan et al: "Silanation of silica surfaces. A new method of constructing pure or mixed monolayers", Langmuir, vol. 7, 1991, pp. 1647-1651.

"Sneh et al: ""Thermal Stability of Hydroxyl Groups on a Well-Defined Silica Surface""; Journal of Physical Chemistry, v. 99, 1995, 4639-4647."

Sonmez et al: "Fundamental aspects of spherical oil agglomeration of calcite", Colloids and Surfaces A: Physicochemical and Engineering Aspects, vol. 225, 2003, pp. 111-118.

Srinivasan et al: "Effect of surface coverage on the conformation and mobility of C18-modified silica gels"; Analytical and Bioanalytical Chemistry, v. 384, 2006,514-524.

Starck et al: "Simple method for controlled association of colloidal-particle mixtures using pH-dependent hydrogen bonding", Langmuir, vol. 25, 2009, pp. 21 14-2120.

Su et al: "Role of oily bubbles in enhancing bitumen flotation", Minerals Engineering, vol. 19, 2006, pp. 641-650.

Trican Well Service: "Lightening the Load"; New Technology Magazine Jan./Feb. 2010 pp. 43-44.

Wang et al: "Effects of Silanol Density, Distribution, and Hydration State of Fumed Silica on the Formation of Self-Assembled Monolayers of n-Octadecyltrichlorosilane"; Langmuir, v. 16, 2000, 5008-5016.

Wang et al: "Packing and Thermal Stability of Polyoctadecylsiloxane Compared with Octadecylsilane Monolayers"; Langmuir, v. 16, 2000, 6298-6305.

Wheelock et al: The role of air in oil agglomeration of coal at a moderate shear rate, Fuel, vol. 73, No. 7, 1994, pp. 1103-1107.

Yanazawa et al: "Precision Evaluation in Kr Adsorption for Small BET Surface AreaMeasurements of Less Than 1 m2"; Adsorption, v. 6, 2000, 73-77.

Search Report and Written Opinion for PCT/IB2011/001531 mailed Feb. 29, 2011.
Ballistreri et al: "Mechanism of Thermal Degradation of Polyurethanes Investigated by Direct Pyrolysis in the Mass Spectrometer"; Journal of Polymer Science: Polymer Chemistry Edition, vol. 18, 1923-1931 (1980).
Jones et al: "Alternate Path Gravel Packing"; SPE paper 22796, Oct. 1991.
Chen et al: "Gravel Packing Deep Water Long Horizontal Wells Under Low Fracture Gradient"; SPE Paper 90552 Sep. 2004.
Jones et al: "Gravel Packing Horizontal Wellbores with Leak-Off Using Shunts"; SPE paper 38640 Oct. 1997.
Ledoux et al "Infrared Study of the OH Groups in Expanded Kaolinite"; Science 17, v. 143, No. 3603, 1964, 224-246.
Morishige et al: "X-ray Diffraction Study of Kr, N2, and H2O Adsorbed on Pyrogenic Silica"; Langmuir, v. 17, 2001, 7291-7295.
Marques et al: "The 200th Horizontal Openhole Gravel-Packing Operation in Campos Basin: A Milestone in the History of Petrobras Completion Practices in Ultradeep Waters"; SPE Paper 10634, Oct. 1997.

"Pedroso et al:""Lightweight Proppants: Solution for Gravel Packing Horizontal Wells Under Extreme Conditions"""; SPE Paper 98298, Feb. 2006".
Pedroso et al: "New Solutions to Extend the Application Window of Horizontal Openhole Gravel Pack"; SPE paper 96257 Oct. 2005.
Schlumberger Quantum Perfpac Brochure 2004.
Schlumberger OptiPac Brochure 2007.
Schlumberger AquaPac Brochure 2007.
Tolan et al: "Gravel Packing Long Openhole Intervals With Viscous Fluids Utilizing High Gravel Concentrations: Toe-to-Heel Packing Without the Need for Alternate Flow Paths"; SPE paper 121912 Aug. 2009.
Welling et al: "Conventional High Rate Well Completions: Limitations of Frac&Pack, High Rate Water Pack and Open Hole Gravel Pack Completions"; SPE Paper 39475 Feb. 1998.
Ojo et al: "Factors Affecting Horizontal Well Gravel Pack Efficiency" Journal of Canadian Petroleum Technology vol. 47 (No. 12) pp. 50-54 Dec. 2008.

* cited by examiner

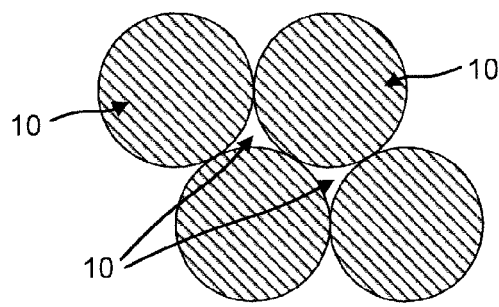
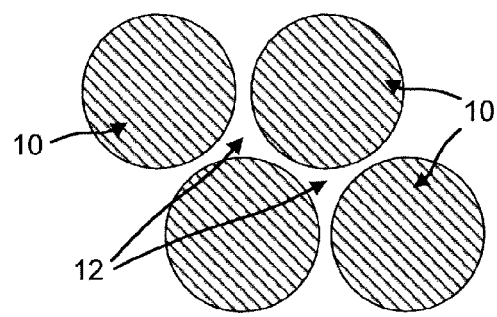
Fig 1
Fig 2
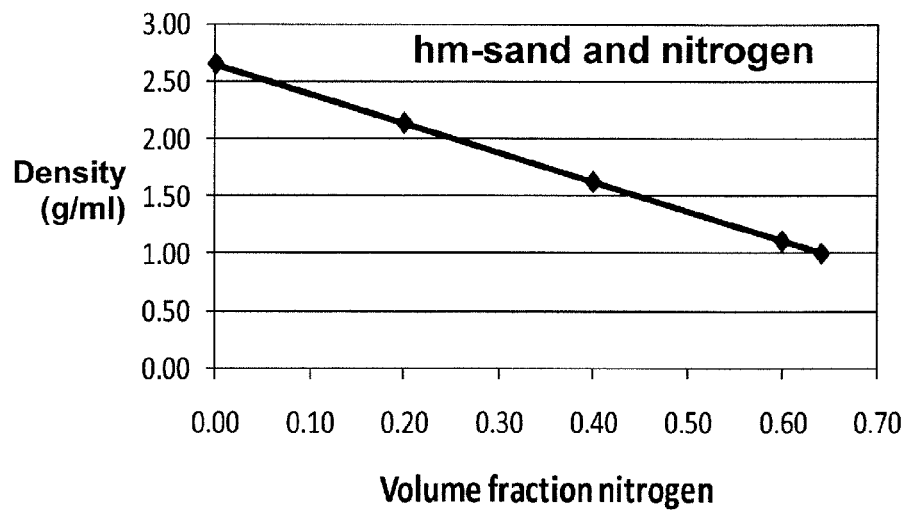
Fig 3
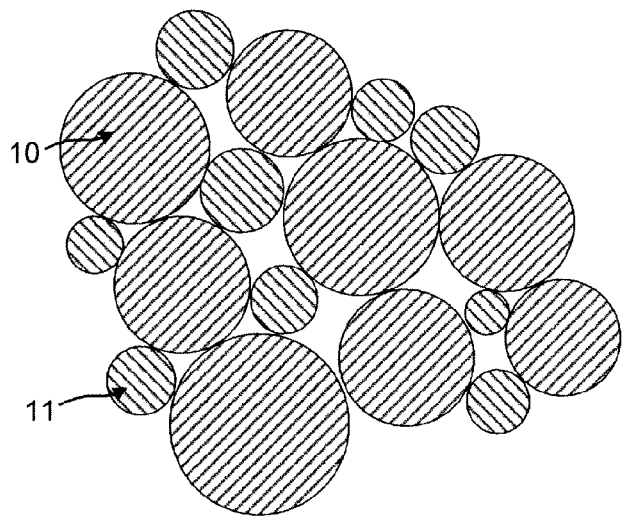
Fig 4

DELIVERY OF PARTICULATE MATERIAL BELOW GROUND

FIELD OF THE INVENTION

The invention relates to delivery of particulate material to a location below ground. A significant application is as part of a method of hydraulic fracturing of a subterranean reservoir formation, placing proppant in the fracture so as to keep the fracture open as a flow path. However, the invention also extends to other applications where placing of particulate material underground, notably within subterranean reservoirs, is required. It is envisaged that the invention will be used in connection with exploration for, and production of, oil and gas.

BACKGROUND OF THE INVENTION

Placing particulate material at a location below ground is a very significant part of a hydraulic fracturing operation. It may also be done in the context of various other operations carried out on underground wells including placing a gravel pack when completing a well. Hydraulic fracturing is a well established technique for reservoir stimulation. Fluid is pumped under pressure into a subterranean formation, forcing portions of the formation apart and creating a thin cavity between them. When pumping is discontinued the natural pressure in the subterranean formation tends to force the fracture to close. To prevent the fracture from closing completely it is normal to mix a solid particulate material (termed a proppant) with the fracturing fluid at the surface and use the fluid to carry the proppant into the fracture. When the fracture is allowed to close, it closes onto the proppant and a flow path to the wellbore between the proppant particles remains open. The proppant is then under considerable pressure from the formation rock pressing on it.

When the proppant is mixed with the fracturing fluid at the surface and pumped into the wellbore it is subjected to very high shear. The proppant-laden fluid then flows down the wellbore under conditions of lower shear. Subsequently it turns and flows out of the wellbore and into the fracture in the formation. Entry to the fracture may be associated with an increase in shear, in particular if the wellbore is cased and the fluid passes through perforations in the wellbore casing to enter the fracture. Once the fluid enters the fracture, and as the fracture propagates and extends into the reservoir, the fluid is subjected to much less shear. Suspended solid begins to settle out. Subsequently pumping is discontinued, allowing the fracture to close onto the proppant packed in the fracture.

In order that the fluid can convey particulate material in suspension, and place it across the fracture face, it is conventional to include a viscosity-enhancing thickening agent in the fluid. Typically the fluid is then formulated so as to achieve a viscosity of at least 100 centipoise at 100 sec$^{-1}$ at the temperature of the reservoir. Guar is widely used for this purpose. Guar derivatives and viscoelastic surfactants may also be used. However, for some fracturing operations, especially where the rock has low permeability so that leak off into the rock is not a significant issue, it is preferred to pump a fluid, often called "slickwater", which is water or salt solution containing a small percentage of friction reducing polymer which does not significantly enhance viscosity as much as a thickening agent such as guar. The fluid then has low viscosity. This considerably reduces the energy required in pumping but keeping particulate material in suspension becomes much more difficult and a higher pump flow rate is commonly used.

As recognized in Society of Petroleum Engineers Papers SPE98005, SPE102956 and SPE1125068 conventional proppant particles suspended in slickwater pumped into a large fracture will settle out more quickly than is desired and form a so-called "bank" or "dune" close to the wellbore. Because of this premature settling, proppant may not be carried along the fracture to prop the full length of the fracture and proppant may not be placed over the full vertical height of the fracture. When pumping is stopped and the fracture is allowed to close, parts of the fracture further from the wellbore may not contain enough proppant to keep them sufficiently open to achieve the flow which would be desirable As a result, the propped and effective fracture size may be less than the size created during fracturing.

One approach to improving the transport of particulate proppant has been to use a material of lower specific gravity in place of the conventional material which is sand or other relatively heavy mineral (sand has a specific gravity of approximately 2.65). Society of Petroleum Engineers paper SPE84308 describes a lightweight proppant having a specific gravity of only 1.75 which is a porous ceramic material coated with resin so that pores of the ceramic material remain air-filled. This paper also describes an even lighter proppant of specific gravity 1.25 which is based on ground walnut hulls. This is stated to be a "resin impregnated and coated chemically modified walnut hull".

These lightweight proppants are more easily suspended and transported by slickwater and their use is further discussed in SPE90838 and SPE98005, the latter paper demonstrating that settling out is reduced compared to sand, although not entirely avoided.

There have been a number of other disclosures of proppants lighter than sand. For example U.S. Pat. No. 4,493,875 (3M) describes a novel proppant consisting of composite particles, the core of which is a conventional particle such as silica sand and the coating or shell of which is a thin void-containing layer such that the overall density of the composite particle approaches that of the fracturing fluid. Preferably, the coating/shell comprises hollow glass microspheres embedded in an adhesive which bonds to the core.

US patent application 2008/277,115 A1 (Rediger et al., Georgia-Pacific Chemicals, Inc.) also describes a composite proppant which is a porous ceramic or a silica sand coated with a low density material (e.g. cork particles) which is bound to the substrate using a Novolac resin crosslinked with hexamine—the resultant example proppants have specific gravities in the range 1.94-2.37 kg/m$^3$.

U.S. Pat. No. 7,491,444 (Oxane Materials, Inc.) describes a process for making proppant particles by creating a shell around a template particle which may be hollow. The particles have specific gravities in a range extending to less than 1.0.

US2005/096207 and US2006/016598 (Thomas Urbanek) describe processes for making low density ceramic proppant particles. The products are claimed to have a specific gravity as low as 1.0 in the second of these documents.

A recognized issue with lightweight proppants is that they may not be as strong as sand and are at risk of becoming partially crushed when a hydraulic fracture is allowed to close on the proppant placed within it. An approach to the suspension of particulate proppant which has recognized this issue is disclosed in US2007/015669, also in WO2009/009886 and in "Lightening the Load" New Technology Magazine, January/February 2010 pages 43 and 44. According to the teachings of these documents, a conventional proppant such as sand is treated to render its surface hydrophobic and is added to the slurry of proppant and water. Bubbles adsorb to the hydrophobic solid particles so that the adsorbed gas gives the particles a lower effective density. The literature describing this approach advocates it on grounds that the conventional sand is both cheaper and stronger than lightweight proppant.

SUMMARY OF THE INVENTION

According to one aspect of the present invention there is provided a wellbore fluid comprising an aqueous carrier liquid and first and second hydrophobic particulate materials suspended therein, where the first hydrophobic particles have a higher specific gravity than the second hydrophobic particles, the fluid also comprising a gas to wet the surface of the particles and bind them together as agglomerates.

In a second aspect the invention provides a method of delivering particulate material below ground, comprising supplying, underground, a composition comprising an aqueous carrier liquid in which there are suspended at least two particulate materials which are hydrophobic, where a first one of these materials has a higher specific gravity than a second one, the fluid also comprising a gas wetting the surface of the particles and binding the particles together such that agglomerates of the particulate materials held together by the gas are present below ground.

In some embodiments of this invention the delivery below ground is done in the course of fracturing a reservoir formation. This may be a gas reservoir and the fracturing step may be followed by producing gas, gas condensate or a combination of them from the formation through the fracture and into a production conduit in fluid communication therewith.

Agglomeration may be prevented or reversed when the composition is subjected to shear. As already mentioned a composition which is pumped downhole is subjected to varying amounts of shear in the course of the journey downhole. Consequently agglomeration may take place at the subterranean location to which the particulate material is delivered. However, it is possible that agglomeration may take place or commence in the course of flow towards the subterranean location where the material will serve its purpose.

It will be appreciated that the present invention makes use of two materials which are particulate in the sense that each of them is present as many small particles and uses them to serve two purposes. The first particulate material is a material which it is desired to place at a subterranean location. In significant forms of this invention it serves as a proppant placed in a hydraulic fracture. The second particulate material aids transport by assisting suspension in the carrier fluid. The agglomerates will contain both the denser first particles and the lighter second particles. The presence of the lighter particles helps to reduce the density of the agglomerates, which is beneficial because agglomerates of lower density will settle out of the carrier liquid more slowly and as a result they can be transported more effectively to their intended destination.

The presence of gas in the agglomerates of hydrophobic particles also reduces their overall density. This is consistent with the teaching of prior documents to utilize adsorbed gas to enhance buoyancy. However, we have found that the volume of gas which can be incorporated into stable agglomerates is limited and may not reduce the effective density to the extent which might be hoped for. Secondly, when a particulate material is made lighter by means of adsorbed gas, that gas will be compressed by the increasing hydrostatic pressure as it is pumped downhole into a fracture. The volume occupied by gas will thus be reduced relative to the particulate material. Consequently, the volume of gas which must be supplied at the surface, in order to provide a desired volume of gas downhole, may be large.

When both lighter and denser particulates are agglomerated with gas, in accordance with this invention, the overall density of the particulates may be lower than would be achievable without the lighter particulate material. Secondly a smaller volume of gas may be required in order to achieve the desired reduction of density under downhole hydrostatic pressure. Nevertheless it should be appreciated that when agglomerates are formed in accordance with this invention the amount of gas contained in them may be less than the maximum possible Inhibiting the settling out of particulate material allows it to be transported more effectively to its intended destination. In the context of hydraulic fracturing the length and/or vertical height of fracture (i.e. the fracture area) which remains propped open after pumping has ceased is greater than would be possible if only the first particulate material was present. The compositions used in this invention may be formulated such that the resulting agglomerates formed in accordance with this invention have a density not exceeding 1.4 g/ml and preferably not exceeding 1.1 g/ml. In some embodiments of this invention agglomerates are at or close to neutral buoyancy or are light enough to float in the carrier liquid and do not settle.

The denser first particulate material may have greater strength to resist crushing than does the lighter second particulate material. When the fracture is allowed to close onto the particulate material, the agglomerates will be squeezed and eventually subjected to the crushing pressure of the rock formation. The second, lighter, particulate material may be crushed and deformed so that it does not function as a proppant, but this failure of the second material will be acceptable because the first material has been placed in the fracture and acts as the desired proppant. The overall result is an improvement in the effectiveness of a fracturing operation because the length of fracture which remains propped open is greater than would be the case if the first particulate material was used alone.

It is also possible that the lighter second particulate material has adequate strength to resist crushing but is more expensive than the first particulate material. In this event the use of both particulate materials gives an economic benefit: the second material assists transport and leads to the benefit that proppant is again carried further into the fracture then would be the case if the first, denser proppant was used alone, while but the use of a mixture of particulate materials is less expensive than using only the more expensive second material.

The first hydrophobic particles (which are the denser particulate material) may have a specific gravity of 1.8 or above, possibly at least 2.0 or 2.5, although it is also possible that the first particulate material could be a lightweight material such as material with specific gravity in a range from 1.5 or 1.6 up to 1.8. The second, lighter hydrophobic particulate material may have a specific gravity less than 1.5 and preferably less than 1.3. The second particulate material may possibly have a specific gravity not greater than 1.0. The amounts of the first and second particulate materials may be such that they have a ratio by volume in a range from 5:1 to 1:5, possibly 4:1 to 1:4 and possibly 3:1 to 1:4.

Sometimes a figure quoted in the literature for the density of a particulate material is a bulk density which is the mean density of a quantity of the particulate material together with anything present in the interstitial spaces between particles. On this basis, wet sand has a higher density than dry sand because the bulk density includes water between particles of sand. By contrast, specific gravity of the particulate materials refers to the specific gravity of the particles themselves, without considering interstitial material. For individual particles specific gravity is the weight of a particle relative to the weight of an equal volume of water. If the particles are formed of a homogenous material it is the specific gravity of that material. If the particles are hollow the specific gravity is still the weight of a particle relative to the weight of an equal volume of water, but this value of specific gravity is a value for the outer shell and the enclosed hollow interior together.

The first and second particles may be formed of materials which are inherently hydrophobic or may be particles which are hydrophilic but have a hydrophobic coating on their surface. For instance, ordinary silica sand which is commonly used as a proppant is hydrophilic and is not agglomerated by oil or gas in the presence of water. By contrast, we have found that sand which has been surface treated to make it more hydrophobic will spontaneously agglomerate in the presence of oil, air or nitrogen gas. The first particulate material used for this invention may be such hydrophobically modified sand. As an alternative to sand or other mineral, the particulate material could be a manufactured ceramic proppant, treated to give it a hydrophobically modified surface.

A quantitative indication of the surface polarity of a solid (prepared with a smooth, flat surface) is the concept of critical surface tension pioneered by Zisman (see Fox and Zisman J. Colloid Science Vol 5 (1950) pp 514-531 at page 529). It is a value of surface tension such that liquids having a surface tension against air which is lower than or equal to this value will spread on the surface of the solid whereas those of higher surface tension will remain as droplets on the surface, having a contact angle which is greater than zero. A strongly hydrophobic solid has a low critical surface tension. For instance the literature quotes a critical surface tension for polytetrafluoroethylene (PTFE) of 18.5 mN/m and for a solid coated with heptadecafluoro-1,1,2,2-tetra-hydro-decyl-trichlorosilane the literature value of critical surface tension is 12 mN/m. By contrast the literature values of critical surface tension for soda-lime glass and for silica are 47 and 78 mN/m respectively.

We have found that an analogous measurement of the hydrophobicity of the surface of a particulate solid can be made by shaking the solid with a very hydrophobic oil (preferably a silicone oil) having a low surface tension and mixtures of ethanol and water with a progressively increasing proportion of ethanol. This may be done at a room temperature of 20° C. The surface tensions of a number of ethanol and water mixtures are tabulated in CRC Handbook of Chemistry and Physics, 86$^{th}$ edition, section 6 page 131.

Increasing the proportion of ethanol in the aqueous phase (i.e. the ethanol and water mixture) reduces its surface tension. Eventually a point is reached when the surface tension of the aqueous phase is so low that the solid can no longer be agglomerated by the oil. The boundary value at which agglomeration by the oil ceases to occur is a measure of the hydrophobicity of the solid and will be referred to as its "agglomeration limit surface tension" or ALST.

We have observed that particulate solids which can undergo spontaneous aggregation from suspension in deionised water on contact with oil always display an ALST value of approximately 40 mN/m or less. This ALST test covers a range of values of practical interest, but it should be appreciated that if no agglomeration takes place, this test does not give a numerical ALST value, but demonstrates that the surface does not have an ALST value of 40 mN/m or less. Moreover, if the surface has an ALST value below the surface tension of pure ethanol (22.4 mN/m at 20° C.), this test will not give a numerical ALST value but will show that the ALST value is not above 22.4 mN/m.

When particulate materials to be agglomerated are not inherently hydrophobic, a range of different methods can be used to modify the surface of solid particles to become more hydrophobic—these include the following, in which the first three methods provide covalent bonding of the coating to the substrate.

Organo-silanes can be used to attach hydrophobic organo-groups to hydroxyl-functionalized mineral substrates such as proppants composed of silica, silicates and alumino-silicates. The use of organosilanes with one or more functional groups (for example amino, epoxy, acyloxy, methoxy, ethoxy or chloro) to apply a hydrophobic organic layer to silica is well known. The reaction may be carried out in an organic solvent or in the vapour phase (see for example Duchet et al, Langmuir (1997) Vol 13 pp 2271-78).

Organo-titanates and organo-zirconates such as disclosed in U.S. Pat. No. 4,623,783 can also be used. The literature indicates that organo-titanates can be used to modify minerals without surface hydroxyl groups, which could extend the range of materials to undergo surface modification, for instance to include carbonates and sulphates.

A polycondensation process can be used to apply a polysiloxane coating containing organo-functionalised ligand groups of general formula $P-(CH_2)_3—X$ where P is a three-dimensional silica-like network and X is an organo-functional group. The process involves hydrolytic polycondensation of a tetraalkoxysilane $Si(OR)_4$ and a trialkoxysilane $(RO)_3Si(CH_2)_3X$. Such coatings have the advantage that they can be prepared with different molar ratios of $Si(OR)_4$ and $(RO)_3Si(CH_2)_3X$ providing "tunable" control of the hydrophobicity of the treated surface.

A fluidized bed coating process can be used to apply a hydrophobic coating to a particulate solid substrate. The coating material would typically be applied as a solution in an organic solvent and the solvent then evaporated within the fluidized bed.

Adsorption methods can be used to attach a hydrophobic coating on a mineral substrate. A surfactant monolayer can be used to change the wettability of a mineral surface from water-wet to oil-wet. Hydrophobically modified polymers can also be attached by adsorption.

The surface modification processes above may be carried out as a separate chemical process before the wellbore fluid is formulated. Such pretreatment of solid material to make it hydrophobic would not necessarily be carried out at the well site; indeed it may be done at an industrial facility elsewhere and the pretreated material shipped to the well site. However, it is also possible that some of the above processes, especially an adsorption process, could be carried out at the well site as part of the mixing procedure in which the wellbore fluid is made.

Either or both of the particulate materials of this invention may be inherently hydrophobic but available hydrophobic materials tend to be lighter and thus more suitable as the second particulate material. Thus, one possibility within this invention is that the denser first particulate material is a solid mineral material such as sand with a hydrophobic coating on the exterior of the particles while the second, lighter, particles are an inherently hydrophobic material. Possible materials are natural or synthetic rubbers and hydrophobic polymers such as polyethylene and polypropylene. Polymers may be partially crosslinked or may contain strengthening fillers. For the sake of economy, hydrophobic materials may be materials which are being recycled after a previous use, for example comminuted recycled motor tyres or comminuted recycled polypropylene packaging. Other candidate materials are particles of coal or coal fractions.

Another possibility within this invention is that the second, lighter, particles are hollow. Glass microspheres with a hydrophobic coating are one possibility. We have found that such microspheres can remain intact under significant hydrostatic pressure, although they may later be crushed when a hydraulic fracture closes onto agglomerated proppant within it.

A range of glass microspheres (with a hydrophilic glass surface) are commercially available. Suppliers include 3M Inc and other manufacturers. Available microspheres have specific gravity ranging from 0.125 to 0.6 and the crush strength of such particles increases with their specific gravity. For example microspheres are available with a $d_{50}$ median particle size of 40 micron, a specific gravity of 0.38 and crush strength able to withstand pressures up to 4000 psi (27.58 MPa). Microspheres are also available with $d_{50}$ of 40 micron, a specific gravity of 0.6 and crush strength able to withstand pressures up to 10000 psi (68.95 MPa). Commercially available hydrophilic glass spheres can be made hydrophobic by a surface coating applied by one of the methods mentioned above.

A further possibility is that the second particulate material is a porous solid, such as volcanic pumice, with a hydrophobic coating. Such a material will have light weight because of the air filled pores: the aqueous carrier liquid will not invade these pores because of their small diameter and the hydrophobic coating.

Both particulate solids must of course form a separate solid phase when the agglomeration takes place. At this time they must therefore be insoluble in the carrier liquid, or at least be of low solubility. For many applications of this invention it will be desirable that the particulate solids remains insoluble after agglomeration has taken place. However, it is within the scope of some forms of this invention that the agglomerates might not have a permanent existence and might in time dissolve in surrounding liquid. For instance, incorporation of hydrophobically modified calcium carbonate within a mixed agglomerate with hm-silica would lead to agglomerates which could be partially dissolved by subsequent flow of an acidic solution able eventually to penetrate the hydrophobic coating.

The solid particles used in this invention may vary considerably in shape and size. They may have irregular shapes typical of sand grains which can be loosely described as "more spherical than elongate" where the aspect ratio between the longest dimension and the shortest dimension orthogonal to it might be 5 or less or even 2 or less. Other shapes such as cylinders or cubes are possible, notably if the particles are a manufactured ceramic product. A further possibility is that particulate material may have a platy form, as is the case with mica particles (indeed hydrophobically modified mica particles may be used as the first particulate material). In general, median particle sizes are unlikely to be larger than 5 mm. Median particle sizes are more likely to be 3 mm or less and preferably are 1.6 mm or less. Embodiments of this invention may use mixtures of solid particles where the median particle size is less than 1 mm. It is possible, especially for the denser first material, that at least 90% by volume of the particles have a longest dimension of less than 5 mm, possibly 3 mm or less.

Particle sizes may conveniently be specified by reference to sieve sizes, as is traditional for proppant materials. American Petroleum Institute Recommended Practices (API RP) standards 56 and 60 specify a number of proppant sizes by stating upper and lower US Sieve sizes. 90 wt % of a sample should pass the larger sieve but be retained on the smaller sieve. Thus '20/40 sand' specifies sand having a particle size distribution such that 90 wt % of it passes 20 mesh (840 micron) but is retained on 40 mesh (420 micron). Correspondingly 90 wt % of a sample of 70/140 sand, which is the smallest size recognized by these standards, passes a 70 mesh (210 micron) sieve but is retained on a 140 mesh (105 micron) sieve. It will be appreciated that for any proppant specified by upper and lower sieve sizes, the median and mean particle sizes fall somewhere between the upper and lower sieve sizes.

Another method for determining size of particles is the commonly used technique of low angle laser light scattering, more commonly known as laser diffraction. Instruments for carrying out this technique are available from a number of suppliers including Malvern Instruments Ltd., Malvern, UK. The Malvern Mastersizer is a well known instrument which determines the volumes of individual particles, from which mean and median particle size can be calculated using computer software which accompanies the instrument. When determining particle sizes using such an instrument, the size of an individual particle is reported as the diameter of a spherical particle of the same volume, the so-called "equivalent sphere". Volume median diameter denoted as $D[v,05]$ or $d_{50}$ is a value of particle size such that 50% (by volume) of the particles have a volume larger than the volume of a sphere of diameter $d_{50}$ and 50% of the particles have a volume smaller than the volume of a sphere of diameter $d_{50}$. Particle sizes determined by low angle laser light scattering are similar to particle sizes determined by sieving if the particles are approximately spherical.

Particle size distribution is then conveniently indicated by the values of $d_{10}$ and $d_{90}$ measured in the same way. 10% by volume of the particles in a sample have an equivalent diameter smaller than $d_{10}$. 90% by volume are smaller than $d_{90}$ and so 10% by volume are larger than $d_{90}$. The closer together the values of $d_{10}$ and $d_{90}$, the narrower is the particle size distribution.

In forms of this invention where the first particulate material is a proppant for hydraulic fractures, the first particles may have a $d_{90}$ upper size similar to that of conventional proppant, such as 10 mesh (2 mm) or 20 mesh (840 microns). Their particle size properties may be such that $d_{10}$>110 micron, possibly >120 micron or >150 micron
$d_{50}$<1 mm, possibly <800 micron
$d_{90}$<3 mm, possibly <2 mm or <1 mm The particle size distribution may be sufficiently wide that $d_{90}$ is more than 5 times $d_{10}$, possibly more than 10 times $d_{10}$. These particle size properties may also apply to other forms of this invention, such as those where the method of the invention is applied to preventing lost circulation, or achieving isolation of one zone from another.

However, it is an advantageous feature of this invention that it can be utilized with a first particulate material having a $d_{50}$ of 105 microns or less. We have found that use of a fine particulate material of this size may be advantageous for fracturing shale, notably for fracturing of a gas-bearing shale. Using a fine mesh proppant, that is to say a proppant of small particle size, may be expected to lead to fractures with lower permeability and conductivity than would be achieved with a proppant of larger size. Nevertheless, such fractures can carry gas with acceptable flow rates. The benefit of conveying proppant further into a fracture, so that the fracture has a greater effective size after it closes onto the proppant outweighs the lower conductivity. Overall, the stimulation of the formation is greater.

A fine mesh proppant may have $d_{90}$ below 150 microns, $d_{50}$ below 105 micron and $d_{10}$ of at least 10 microns. A possible material for use as a fine, first particulate material is hydrophobically modified flyash. So called flyash is recovered from the flue gas of coal fired power plants, and is a small particle size material with a high silica content. It typically has $d_{90}$ below 100 micron and specific gravity in the range 1.9 to 2.4.

The second particulate material used in this invention may or may not be of similar particle size to the first. One possibility is that the second particulate material is of somewhat smaller particle size than the first particulate material, especially if the first material has $d_{50}$>120 microns. A candidate for a small size second particulate material is hydrophobically modified hollow spheres, where the hollow spheres (also termed cenospheres) are extracted from flyash. (Cenospheres which form spontaneously in the combustion process are a small percentage of flyash).

It is also possible that one or both of the particulate materials consists of, or includes, hydrophobic elongate fibres. Including fibres in the agglomerated solid may lead to agglomerates which are resistant to change in shape after agglomeration. For fibres, as for other particulate materials, it is preferred that the ALST value does not exceed 38 mN/m. An example of hydrophobic fibres which could be used alone or mixed with other particulate solid is polypropylene fibres having median diameter in a range from 50 to 500 micron and a median length of 3 to 10 mm. Another possibility would be glass fibres of these dimensions modified with a hydrophobic surface layer, suitably by one of the methods mentioned above.

In the context of hydraulic fracturing, it has been found useful to use a first particulate material which serves as a proppant and has a low aspect ratio together with a second, lighter, material which consists of, or includes, hydrophobic fibres. These fibres then reduce the density of the agglomerates during transport and also hinder the eventual settling of proppant from suspension by reason of their shape (which is the subject of another patent application filed concurrently with this application).

The agglomerating agent which binds the particles together as agglomerates is a gas. This gas must be sufficiently hydrophobic to form a phase which does not dissolve in the aqueous carrier liquid, although it is possible for it to have some limited water solubility, as is the case with air and with nitrogen. The volume of gas provided must be sufficient that it agglomerates the particles at downhole pressure. As pointed out above, however, the amount of gas required to bring about agglomeration will be less than if gas was the sole means to reduce the density of particulates.

As mentioned above the amount of gas which can be retained in agglomerates has an upper limit. We have found that agglomeration by gas may be assisted and improved if a small amount of hydrophobic oil is present. However, the amount should be small, such as not more than 10% or not more than 5% or even not more than 2% by volume of the amount of gas downhole. If the amount of oil is larger, agglomeration occurs but the oil displaces gas from the agglomerates and so the amount of gas which can be held by agglomerates is reduced.

The aqueous carrier liquid which is used to transport the particles may be a non-viscous or slickwater formulation. Such a formulation is typically water or a salt solution containing at least one polymer which acts as a friction reducer. A combination of polymers may be used for this purpose. Polymers which are frequently used and referred to as "polyacrylamide" are homopolymers or copolymers of acrylamide. Incorporation of a copolymer can serve to give the "modified" polyacrylamide some ionic character. A polyacrylamide may considered a copolymer if it contains more than 0.1% by weight of other comonomers. Mixtures of homopolymers and copolymers may be used. Copolymers may include two or more different comonomers and may be random or block copolymers. The comonomers may include, for example, sodium acrylate. The polyacrylamide polymers and copolymers useful as friction reducers may include those having an average molecular weight of from about 1000 up to about 20 million, or possibly above, with from about 1 million to about 5 million being typical. Other suitable friction reducers may be used as well; for example vinyl sulfonates included in poly(2-acrylamido-2-methyl-1-propanesulfonic acid) also referred to as polyAMPS.

The polyacrylamide may be used in the treatment fluid an amount of from about 0.001% to about 5% by weight of the treatment fluid but the amount is frequently not over 1% or even 0.5% by weight by weight. In many applications, the polyacrylamide is used in an amount of from about 0.01% to about 0.3% by weight of the fluid. The polyacrylamide may be initially dissolved or dispersed as a concentrate in mineral oil or other liquid carrier to enhance the delivery or mixability prior to its addition to water or a salt solution to make the carrier liquid.

A slickwater formulation may be substantially free of viscosity-enhancing polymeric thickener and have a viscosity which is not much greater than water, for instance not more than 15 centipoise, which is about 15 times the viscosity of water, when viscosity is measured at 20° C. and a shear rate of 100 sec$^{-1}$.

It is particularly envisaged that this invention will be used when fracturing a reservoir formation which has low permeability, so that slickwater is the fracturing fluid of choice. As mentioned above, this has considerable advantage when pumping into the formation but makes suspension of proppant much more difficult.

A reservoir formation of low permeability may well be a gas reservoir, although this is not inevitably so. It may be a gas-bearing shale. A formation of low permeability may have a permeability of no more than 10 millidarcies (10 mD), possibly no more than 1 millidarcy. Its permeability may be even lower, such as less than 100 microdarcy, or even less than 1 microdarcy.

This invention may also be used where the carrier liquid is a more traditional fracturing fluid incorporating a thickening agent to increase the viscosity of the fluid. Such a thickening agent may be a polymer. It may be a polysaccharide such as guar, xanthan or diutan or a chemically modified polysaccharide derivative such as hydroxyalkylcellulose or a hydroxyalkylguar. These polysaccharide thickeners may be used without cross linking or may be cross-linked to raise viscosity further. Viscoelastic surfactants are another possible thickening agent which may be used to increase viscosity. We have observed that some thickening of the carrier liquid does not prevent agglomeration, although it may be preferred that the viscosity is not allowed to become too high before agglomeration takes place.

The agglomeration of proppant particles will lead to some small-scale non-uniformity of the distribution of proppant within a fracture when the fracture is allowed to close onto the proppant. Distributing proppant throughout a fracture, but with some non-uniformity in the distribution of proppant (sometimes referred to as heterogeneous proppant placement) may be helpful in enhancing fracture conductivity. In some embodiments of this invention, localized non-unity may be deliberately enhanced.

One known method for heterogenous proppant placement which may be used in this invention is to pump a fluid containing suspended proppant alternately with a fluid containing less of the suspended proppant or none at all. This approach is the subject of U.S. Pat. No. 6,776,235. Another known method which may be employed is to pump the proppant together with a removable material, referred to as a 'channelant'. After pumping has ceased and the fracture has closed onto proppant in the fracture, removal of the channelant leaves open pathways between islands or pillars of the proppant. This approach is the subject of WO2008/068645, the disclosure of which is incorporated herein by reference.

A degradable channelant material may be selected from substituted and unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures of such materials. Representative examples are polyglycolic acid or PGA, and polylactic acid or PLA. These materials function as solid-acid precursors, and undergo hydrolytic degradation in the fracture.

Agglomerates of hydrophobic particles and a gas as agglomerating agent will form spontaneously in an aqueous carrier liquid when the materials are mixed together. One possibility is that the particulate materials, carrier liquid and agglomerating gas are all mixed together at the surface and then pumped down a wellbore. In this case the particles may agglomerate before passing through the pumps. If so, they may be sheared apart by the pumps, but spontaneously reform downstream from the pumps as they pass down the wellbore.

A possibility to avoid passing the agglomerates through the pumps is that the gas is compressed at the surface and then admitted to the high pressure flowline downstream of the surface pumps which are driving the carrier liquid and the particulate materials into the wellbore. As a variant of this, the gas could be transported down the wellbore in a separate pipe so as to travel to a considerable depth underground before mixing with the particulate materials.

Another approach is to allow the materials to mix, but inhibit agglomeration for at least part of the journey of the carrier liquid and entrained materials to the subterranean location where the agglomerates are required. Some possibilities for this are as follows:

Encapsulation or coating. The particulate materials are coated with a hydrophilic material which dissolves slowly or undergoes chemical degradation under conditions encountered at the subterranean location, thereby exposing the hydrophobic surface within. Degradation may in particular be hydrolysis which de-polymerises an encapsulating polymer. While such hydrolytic degradation may commence before the overall composition has travelled down the wellbore to the reservoir, it will provide a delay before contact between agglomerating gas and exposed hydrophobic surface becomes significant.

A number of technologies are known for the encapsulation of one material within another material. Polymeric materials have frequently been used as the encapsulating material. Some examples of documents which describe encapsulation procedures are U.S. Pat. No. 4,986,354, WO 93/22537 and WO 03/106809. Encapsulation can lead to particles in which the encapsulated substance is distributed as a plurality of small islands surrounded by a continuous matrix of the encapsulating material. Alternatively encapsulation can lead to core-shell type particles in which a core of the encapsulated substance is enclosed within a shell of the encapsulating material. Both core-shell and islands-in-matrix type encapsulation may be used.

An encapsulating organic polymer which undergoes chemical degradation may have a polymer chain which incorporates chemical bonds which are labile to reaction, especially hydrolysis, leading to cleavage of the polymer chain. A number of chemical groups have been proposed as providing bonds which can be broken, including ester, acetal and amide groups. Cleavable groups which are particularly envisaged are ester and amide groups both of which provide bonds which can be broken by a hydrolysis reaction.

Generally, their rate of cleavage in aqueous solution is dependent upon the pH of the solution and its temperature. The hydrolysis rate of an ester group is faster under acid or alkaline conditions than neutral conditions. For an amide group, the decomposition rate is at a maximum under low pH (acidic) conditions. Low pH, that is to say acidic, conditions can also be used to cleave acetal groups.

Thus, choice of encapsulating polymer in relation to the pH which will be encountered after the particles have been placed at intended subterranean location may provide a control over the delay before the encapsulated material is released. Polymers which are envisaged for use in encapsulation include polymers of hydroxyacids, such as polylactic acid and polyglycolic acid. Hydrolysis liberates carboxylic acid groups, making the composition more acidic. This lowers the pH which in turn accelerates the rate of hydrolysis. Thus the hydrolytic degradation of these polymers begins somewhat slowly but then accelerates towards completion and release of the encapsulated material. Another possibility is that a polymer containing hydrolytically cleavable bonds may be a block copolymer with the blocks joined through ester or amide bonds.

Sensitivity to Temperature.

A development of the use of a hydrophilic coating makes use of the difference between surface temperatures and temperatures below ground, which are almost always higher than at the surface. During transit to the subterranean location, the carrier liquid and everything suspended in it will pass through a wellbore exposed to subterranean temperatures and will begin to heat up, but if the flow rate is substantial, the flowing composition will reach the subterranean location at a temperature well below the natural temperature at that location. In particular, in the case of hydraulic fracturing the fracturing fluid will leave the wellbore and enter the fracture at a temperature significantly below the reservoir temperature. A possibility, therefore, would be to coat the hydrophobic particles with a coating of a hydrophilic material which remains intact at surface temperatures, but melts or dissolves in the carrier liquid at the temperature encountered below ground.

Generating Gas Below Ground.

Another possible approach for delaying agglomeration during at least part of the journey of the materials to the subterranean location where the agglomerates are required is to generate the agglomerating gas chemically, for example by including aluminium powder in the composition and formulating the carrier liquid to be alkaline so that hydrogen is generated by reaction of aluminium and the aqueous alkaline carrier liquid. Conversely, iron or zinc particles could be incorporated in a fluid with pH below 7 to generate hydrogen. A further possibility for generating gas below ground would be to pump a neutral slickwater fluid containing suspended calcium carbonate particles, followed by an acidic slickwater fluid containing hydrophobic fibres and hydrophobic particulate proppant. Carbon dioxide would then be liberated below ground on contact between the acidic slickwater and the carbonate previously placed below ground. In the methods above for generating gas below ground, the solid material could be encapsulated in or coated with a material which dissolves or melts at the reservoir temperature, thus delaying the start of the chemical generation of gas. Another way to generate carbon dioxide would be to incorporate nanoparticulate polycarbonates which decompose, liberating carbon dioxide, at a temperature of around 150° C.

Discussion above has focused on placing particulate material below ground. However, the invention also has application to the removal of particulate material in wellbore cleanout. After hydrophobic particulate materials have been placed in a fracture (or other location underground) the removal of hydrophobic particulate material remaining in the wellbore can be carried out by using coiled tubing to pump gas, or a mixture of gas and aqueous liquid, into the bottom of the wellbore while the wellbore contains aqueous liquid. This gas will rise towards the surface. If it encounters hydrophobic particulate material it will agglomerate that material into lightweight particles which will rise or be carried upward to the surface.

BRIEF DESCRIPTION OF THE DRAWINGS

FIG. 1 diagrammatically illustrates features of a close-packed agglomerate;

FIG. 2 similarly illustrates features of an agglomerate which is not close packed;

FIG. 3 is a graph of density against composition for mixtures of nitrogen and hydrophobically modified sand;

FIG. 4 diagrammatically illustrates an agglomerate of mixed particles;

DETAILED DESCRIPTION

Figure 5:
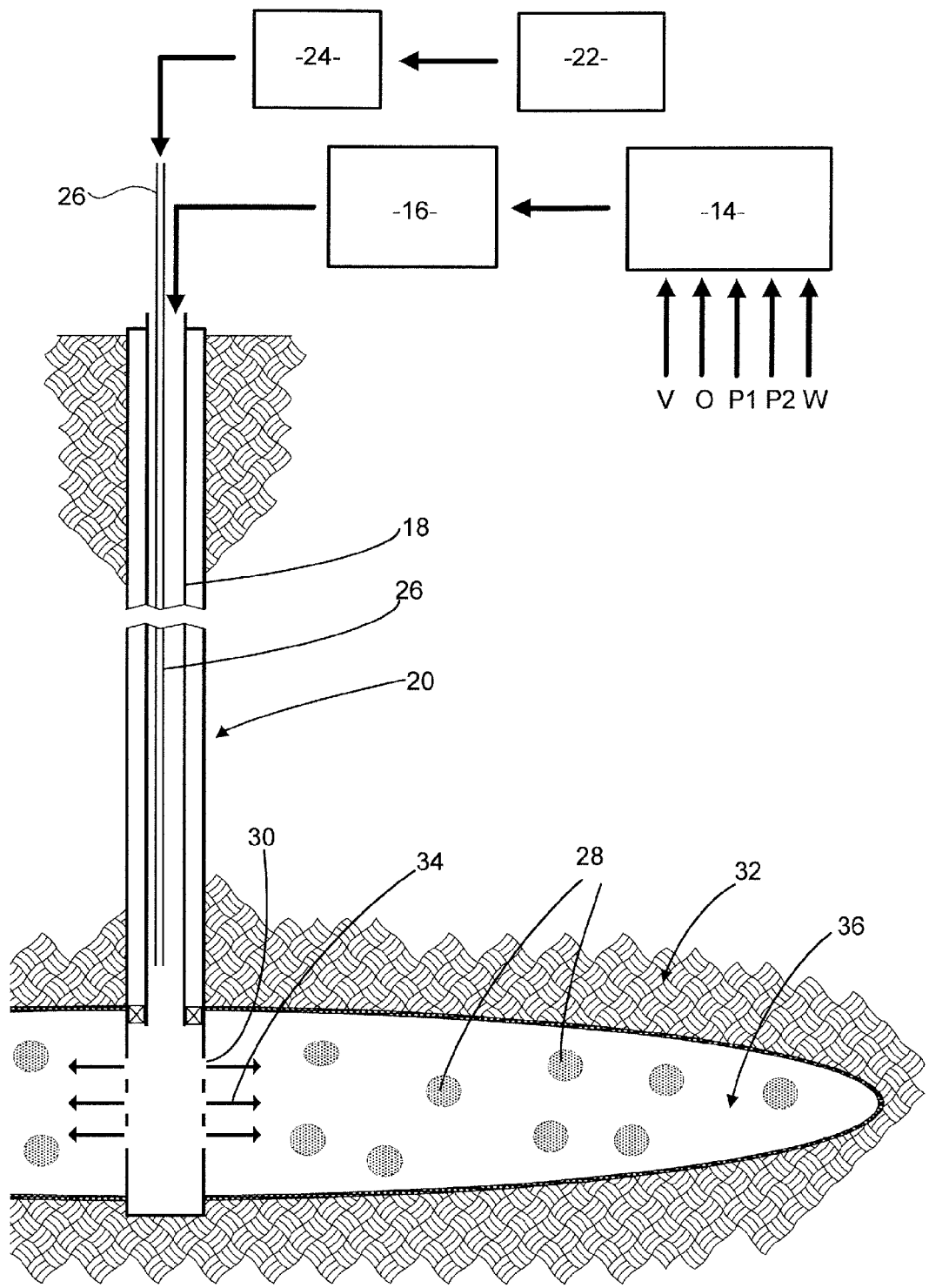
FIG. 5 schematically illustrates the use of the invention in fracturing.

FIG. 1 diagrammatically illustrates a portion of an agglomerate formed from particles in a close packed arrangement. In this illustration the particles are spheres 10 of uniform size. The interstitial volume, that is the spaces 12 between particles, is determined by the geometry of the arrangement. For an agglomerate of a large number of close packed spheres of uniform size, it can be calculated that the interstitial volume amounts to a volume fraction of 0.36 while the spheres occupy a volume fraction of 0.64. If the particles are not spherical or are not uniformly sized the interstitial volume will be a different fraction of the overall volume, although still dependent on geometry. Notably, a mixture of particle sizes can give a closely packed arrangement in which the interstitial volume fraction is smaller than 0.36.

It can be envisaged that if the amount of agglomerating agent is larger than the interstitial volume of a close packed arrangement, the particles would still be agglomerated but will not be in a completely close packed state. They would instead be slightly spaced as shown in FIG. 2 and the interstitial volume would then be larger, thus taking up the available amount of agglomerating agent.

We have found that when hydrophobic particles are agglomerated with oil this does indeed happen. A quantity of oil in excess of the minimum amount required to bring about agglomeration can be included in the agglomerates. However, we have found that this does not happen, or does not happen to the same extent, when the agglomerating agent is gas.

FIG. 3 is a graph of density against volume fraction of nitrogen in hypothetical mixtures of hydrophobically modified sand (specific gravity 2.65) and nitrogen gas as an agglomerating agent. The specific gravity of the nitrogen gas is taken to be 0.081 at a pressure of 10 MPa and a temperature of 400° Kelvin (127° C.) representative of a downhole pressure and temperature. If the agglomerates were to have a nitrogen volume fraction of 0.64 (that is 64 parts by volume nitrogen and 36 parts by volume sand) they would have a density of 1 gm per ml, which is neutral buoyancy in water. However, we have found by experiment that stable agglomerates with air or nitrogen as agglomerating agent do not contain such a high volume of fraction of the gas and are denser than water, as will be shown in Example 5 below.

By contrast, if a mixture of denser and lighter hydrophobic particulate materials is used in accordance with this invention, a smaller volume fraction of gas is needed to achieve neutral buoyancy in water. The particles in such an agglomerate do not need to be the same size. FIG. 4 diagrammatically illustrates part of an agglomerate of first, denser particles 10 and second, less dense particles 11, where the second particles 11 are smaller than the first particles 10.

The table below sets out some calculated densities for agglomerates containing hydrophobically modified sand mixed with polypropylene particles having a specific gravity of 0.9. Again the agglomerating agent is nitrogen gas.

| Composition of particulate mixture | | Volume fraction of nitrogen | Density (g/ml) |
| --- | --- | --- | --- |
| 80 vol % hm-sand | 20 vol % polypropylene | 0.36 | 1.5 |
| 60 vol % hm-sand | 40 vol % polypropylene | 0.36 | 1.28 |
| 40 vol % hm-sand | 60 vol % polypropylene | 0.36 | 1.05 |
| 35 vol % hm sand | 65 vol % polypropylene | 0.36 | 1.0 |
| 80 vol % hm-sand | 20 vol % polypropylene | 0.5 | 1.19 |
| 58 vol % hm sand | 42 vol % polypropylene | 0.5 | 1.0 |

It is apparent that neutral buoyancy, that is a density of 1 gm/ml, can be achieved with a smaller volume fraction of nitrogen if polypropylene particles are included.

Similar calculations were carried out for particulate mixtures containing hydrophobically modified sand and hydrophobically modified glass microspheres having specific gravity 0.6. The following combinations of materials and proportions were calculated to give agglomerates of neutral buoyancy (assuming that such agglomerates could be made and would be stable).

| Composition of particulate mixture | | Volume fraction of nitrogen | Density |
| --- | --- | --- | --- |
| 60 vol % hm-sand | 40 vol % hm-microspheres | 0.36 | 1.20 |
| 45 vol % hm-sand | 55 vol % hm-microspheres | 0.36 | 1.0 |
| 80 vol % hm sand | 20 vol % hm-microspheres | 0.5 | 1.16 |
| 65 vol % hm sand | 35 vol % hm-microspheres | 0.5 | 1.0 |

Even a second particulate material which is denser than water will reduce the amount of gas required to achieve neutral buoyancy. A mixture of 38 vol % hydrophobically modified sand and 62 vol % waste rubber having a specific gravity of 1.2 would require nitrogen in a volume fraction of 0.45 to achieve a density of 1 gm/ml, whereas sand alone would require a nitrogen volume fraction of 0.64.

In the following examples, Examples 1 to 4 illustrate the preparation of hydrophobically modified materials. Examples 5 onwards show the effect of using mixtures of hydrophobic particulate materials, in accordance with this invention.

Example 1

Hydrophobic Modification of Sand

Sand, having particle size between 20 and 40 US mesh (840 micron and 400 micron), i.e. 20/40 sand, was washed by mixing with ethanol at ambient temperature, then filtering, washing with deionised water and drying overnight at 80° C.

Quantities of this pre-washed sand were hydrophobically modified by treatment with various reactive organosilanes, using the following procedure. 75 gm pre-washed sand was added to a mixture of 200 ml toluene, 4 ml organo-silane and 2 ml triethylamine in 500 ml round bottomed flask. The mixture was refluxed under a nitrogen atmosphere for 4 to 6 hours. After cooling, the hydrophobically modified sand (hm-sand) was filtered off (on a Whatman glass microfiber GF-A filter) and then washed, first with 200 ml toluene, then 200 ml ethanol and then 800 ml deionised water. The hm-sand was then dried overnight at 80° C.

The above procedure was carried out using each of the following four reactive organo-silanes:

5.64 gm Heptadecafluoro-1,1,2,2-tetrahydro-decyl-triethoxysilane (>95% purity, specific gravity=1.41 gm/ml).

5.40 gm Tridecafluoro-1,1,2,2-tetrahydro-octyl-triethoxysilane (>95% purity, specific gravity=1.35 gm/ml).

3.53 gm Octadecyl-trimethoxysilane (90% purity, specific gravity=0.883 gm/ml).

5.93 gm Octadecyldimethyl 3-trimethoxysilylpropyl ammonium chloride (60% active solution in methanol, specific gravity=0.89 gm/ml).

For convenience the hydrophobic groups introduced by these materials will be referred to hereafter as $C_{10}F_{17}H_4$-silyl, $C_8F_{13}H_4$ silyl, $C_{18}H_{37}$-silyl and $C_{18}H_{37}$-aminopropylsilyl, respectively.

It was appreciated that these quantities of organo-silane were far in excess of the stoichiometric amount required to react with all the hydroxyl groups on the surface of the sand particles. 20/40 sand has specific surface area 0.0092 $m^2$/gm (calculated from particle size distribution determined by laser diffraction (Malvern Mastersizer) method). The theoretical maximum concentration of hydroxyl (—OH) groups per unit area of silica surface, is 4.5 hydroxyl groups per square nanometre. From these values it can be calculated that 75 gm sand has (at most) $3.1 \times 10^{18}$ hydroxyl groups exposed on its surface. Using Avogadro's number, 5.64 gm (0.00924 mol) heptadecafluoro-1,1,2,2-tetra-hydro-decyl-triethoxysilane contains $5.56 \times 10^{21}$ molecules. Therefore there is a very high ratio of organo-silane molecules in the reaction solution to surface hydroxyl groups. The calculated number ratio in the case of the $C_{10}F_{17}H_4$-silyl example above was organo-silane$_{(solution)}$/OH$_{(surface)}$=1792. It should be noted that at least some excess organosilane is removed from the treated sand during the filtration and washing stages.

Example 2

The procedure above was carried out with the following reduced quantities of organo-silane:

0.27 gm Heptadecafluoro-1,1,2,2-tetra-hydro-decyl-triethoxysilane number ratio organo-silane$_{(solution)}$/OH$_{(surface)}$=85.8.

0.02 gm Heptadecafluoro-1,1,2,2-tetra-hydro-decyl-triethoxysilane number ratio organo-silane$_{(solution)}$/OH$_{(surface)}$=6.4.

It was found the smallest amount of organo-silane was insufficient to render the sand adequately hydrophobic to be agglomerated.

Example 3

Condensation Coating

Pre-washed 20/40 sand, prewashed as in Example 1 above, was given a hydrophobic surface coating by the simultaneous condensation polymerization of tetraethylorthosilicate (TEOS) and tridecafluoro-1,1,2,2-tetrahydro-octyl-triethoxysilane in 3:1 molar ratio under basic conditions.

200 gm pre-washed sand, 12 ml of aqueous ammonia ($NH_4OH$, 28%), 57 ml of absolute ethanol and 3 ml deionized water were mixed and stirred vigorously (Heidolph mechanical stirrer at 300-400 RPM) for 30 min. Then 0.73 gm (3.53 mmol) of TEOS and 0.6 gm (1.17 mmol) tridecafluoro-1,1,2,2-tetrahydro-octyl-triethoxysilane were added and stirred for 3.5 hrs at room temperature. The resulting hm-sand was then filtered off, washed with ethanol and then with deionized water and dried at 120° C. overnight. This procedure was also carried out using pre-washed 70/140 sand with a mixture of tetraethylorthosilicate (TEOS) and heptadecafluoro-1,1,2,2-tetra-hydro-decyl-triethoxysilane.

Example 4

Condensation Coating of Glass Microspheres

The glass microspheres used had a mean diameter $d_{50}$ of 40 micron and a specific gravity of 0.6. 20 gm microspheres, 12 ml of aqueous ammonia ($NH_4OH$, 28%), 57 ml of absolute ethanol and 3 ml deionized water were mixed and stirred vigorously (Heidolph mechanical stirrer at 300-400 RPM) for 30 min. Then 0.73 gm (3.53 mmol) of TEOS and 0.6 gm (1.17 mmol) tridecafluoro-1,1,2,2-tetrahydro-octyl-triethoxysilane were added and stirred for 4 hrs at room temperature. The resulting hm-microspheres were then filtered off, washed with ethanol and then with deionized water and dried at 120° C. overnight.

Example 5

Agglomeration of hm-Sand and Polypropylene

Sample mixtures were prepared using 20/40 sand, hydrophobically modified with tridecafluoro-1,1,2,2-tetrahydro-octyl-triethoxysilane as in Example 3 and varying proportions of 20/40 polypropylene particles, having a specific gravity of 0.9. The amounts are given in the following table:

| Sample number | $C_8F_{13}H_4$-sand 20/40 | Polypropylene 20/40 | Volume fraction polypropylene |
|---|---|---|---|
| 1 | 2 g | none | 0 |
| 2 | 2 g | 0.2 g | 0.23 |
| 3 | 2 g | 0.4 g | 0.37 |
| 4 | 2 g | 0.6 g | 0.47 |
| 5 | 2 g | 1.0 g | 0.6 |

Each sample was mixed with 16 ml of deionised water in a bottle of about 30 ml capacity, thus leaving an air-filled headspace of about 10-15 ml in the bottle. The bottle was closed and shaken vigorously so that the solids could be agglomerated with air from the headspace.

In the case of the first sample, without polypropylene, a single agglomerate with a smoothly curved surface was formed. This demonstrated that hydrophobically modified 20/40 sand could be agglomerated with air. However, the agglomerate sank to the bottom of the bottle and no change was achieved through further shaking. Since the amount of air in the headspace was larger than the agglomerate formed, it was apparent that the amount of air in the agglomerate had reached the maximum which the agglomerate could retain, indicating that the amount of air which could be retained in the agglomerate was not a sufficiently large volume fraction to give an agglomerate of neutral buoyancy.

In the case of samples 2 and 3 with 0.2 g or 0.4 g polypropylene present the agglomerates again sank to the bottom of the bottle but were less firmly settled than the agglomerate without polypropylene, indicating that the polypropylene in the agglomerates together with the in them was reducing the density compared with the agglomerate without polypropylene. With 0.6 g or 1 g polypropylene present reduction of density went further and some of the agglomerates floated to the top of the water in the bottles.

Next nitrogen was bubbled into the bottles near the bottom of each one. Nearly all of the agglomerates formed from sample 4 with 0.6 g polypropylene present floated in the water. In the case of sample 5 with 1.0 g polypropylene present, all the agglomerates floated in the water.

This experiment was repeated with the modification that five drops of dodecane were added to the samples before nitrogen was bubbled into the bottom of each bottle. Yet again the sample without polypropylene formed a single agglomerate which sank. The agglomerates from samples 4 and 5, with 0.6 g and 1 g polypropylene present all floated. This indicates that a small amount of oil, occupying only a small volume fraction, increases the efficacy of gas in reducing the density of agglomerates.

Example 6

The previous example was repeated using the same, hydrophobically modified 20/40 sand but smaller polypropylene particles all of which passed a 40 mesh sieve. After shaking the closed bottles where some polypropylene was present, slightly more of the agglomerates floated than in the previous example. After bubbling in nitrogen, for the samples with 0.4 g, 0.6 g and 1.0 g polypropylene present, all the agglomerates floated at the top of the water in the bottles. This indicates that the smaller polypropylene particles assisted the reduction in density of the agglomerates formed.

Example 7

Agglomeration of hm-Sand and hm-Microspheres

Samples were prepared using varying proportions of 20/40 sand, hydrophobically modified with tridecafluoro-1,1,2,2-tetrahydro-octyl-triethoxysilane as in Example 3 and hydrophobically modified glass microspheres prepared as in Example 4. The amounts are given in the following table:

| | 20/40 hm-sand | | hm-microspheres | | | |
|---|---|---|---|---|---|---|
| Sample No. | Wt (g) | Vol (ml) | Wt (g) | Vol (ml) | Total vol. solids (ml) | Vol % microspheres |
| 1 | 2 | 0.755 | 0 | 0 | 0.755 | |
| 2 | 1.5 | 0.566 | 0.113 | 0.189 | 0.755 | 25 |
| 3 | 1.0 | 0.377 | 0.226 | 0.377 | 0.754 | 50 |
| 4 | 0.5 | 0.189 | 0.340 | 0.566 | 0.755 | 75 |

Each sample was mixed with 20 ml of deionised water in a bottle of about 30 ml capacity, thus leaving an air-filled headspace in the bottle of 10 ml or more. The bottle was closed and shaken vigorously so that the solids could be agglomerated with air from the headspace.

In the case of the sample 1, without microspheres, a single agglomerate was formed, just as with sample 1 of Example 5.

For all samples with microspheres present some agglomerates sank to the bottom of the bottle but were less firmly settled than the agglomerate without microspheres and some agglomerates floated to the top of the water in the bottles.

Next nitrogen was bubbled into the bottles near the bottom of each one. Almost all of the agglomerates formed from sample 4 with 75 vol % microspheres floated in the water. In the case of sample 5 with 1.0 g polypropylene present, all the agglomerates floated in the water.

This experiment was repeated with the modification that five drops of dodecane were added to the samples before nitrogen was bubbled into the bottom of each bottle. Yet again the sample without microspheres formed a single agglomerate which sank. The agglomerates from samples 3 and 4, with 50 vol % and 75 vol % microspheres, all floated. This indicates that a small amount of oil, occupying only a small volume fraction, increases the efficacy of gas in reducing the density of agglomerates.

Example 8

A procedure similar to the previous example was carried out, replacing the 20/40 sand with 70/140 sand, hydrophobically modified with heptadecafluoro-1,1,2,2-tetrahydro-decyl-triethoxysilane as in Example 3. The amounts of materials were as set out in the following table:

| | 20/40 hm-sand | | hm-microspheres | | | |
|---|---|---|---|---|---|---|
| Sample No. | Wt (g) | Vol (ml) | Wt (g) | Vol (ml) | Total vol. Solids (ml) | Vol % microspheres |
| 1 | 2 | 0.755 | 0 | 0 | 0.755 | |
| 2 | 1.5 | 0.566 | 0.113 | 0.189 | 0.755 | 25 |
| 3 | 1.0 | 0.377 | 0.226 | 0.378 | 0.755 | 50 |

Each sample was mixed with 20 ml of deionised water in a bottle of about 30 ml capacity, thus leaving an air-filled headspace in the bottle of 10 ml or more. The bottle was closed and shaken vigorously so that the solids could be agglomerated with air from the headspace. As before, in the absence of glass microspheres the hm-sand forms an agglomerate which sinks in water. With 25 vol % microspheres, some agglomerates floated (a larger proportion than with 20/40 hm sand in the previous example) and with 50% microspheres almost all agglomerates floated.

A similar result was observed when nitrogen was bubbled into each bottle. The experiment was repeated with the modification that five drops of dodecane were added to the samples before nitrogen was bubbled into the bottom of each bottle. Yet again the sample without microspheres formed a single agglomerate which sank. With 25 vol % microspheres and again with 50 vol % microspheres all the agglomerates floated. This again indicates that a small amount of oil, occupying only a small volume fraction, increases the efficacy of gas in reducing the density of agglomerates.

As a control experiment, 0.5 g 70/14 hm-sand was mixed with 0.34 g of unmodified glass microspheres and 20 g deionised water. This quantity of microspheres amounts to 74 vol % of the solids. On shaking with air the unmodified glass microspheres did not agglomerate and floated at the surface of the water. The hm-sand formed an air agglomerate which sank to the base of the bottle.

Application of the Invention

To illustrate and exemplify use of some embodiments of the method of this invention, FIG. 5 shows diagrammatically the arrangement when a fracturing job is carried out. A mixer 14 is supplied with a small amount of viscosity reducing polymer, a small amount of oil, first and second particulate materials and water as indicated by arrows V, O P1, P2, and W. The mixer delivers a mixture of these materials to pumps 16 which pump the mixture under pressure down the production tubing 18 of a wellbore 20. Nitrogen from a supply 22 pressurized by compressor 24 is driven down a tube 26 within the production tubing 18 and forms agglomerates of the particulate materials when it exits into the flow within tubing 18. The aqueous carrier liquid and suspended agglomerates 28 then pass through perforations 30 into the reservoir formation 32 as indicated by the arrows 34 at the foot of the well.

In the early stages of the fracturing job, the fluid does not contain particulate solid nor added nitrogen but its pressure is sufficiently great to initiate a fracture 36 in the formation 32. Subsequently the particulate materials and nitrogen are mixed, as described above, with the fluid which is being pumped in. Its pressure is sufficient to propagate the fracture 36 and as it does so it carries the suspended agglomerates 28 into the fracture 36. Because the agglomerates have a low density they do not settle out at the entrance to the fracture, but are carried deep into the fracture.

Figure 6:
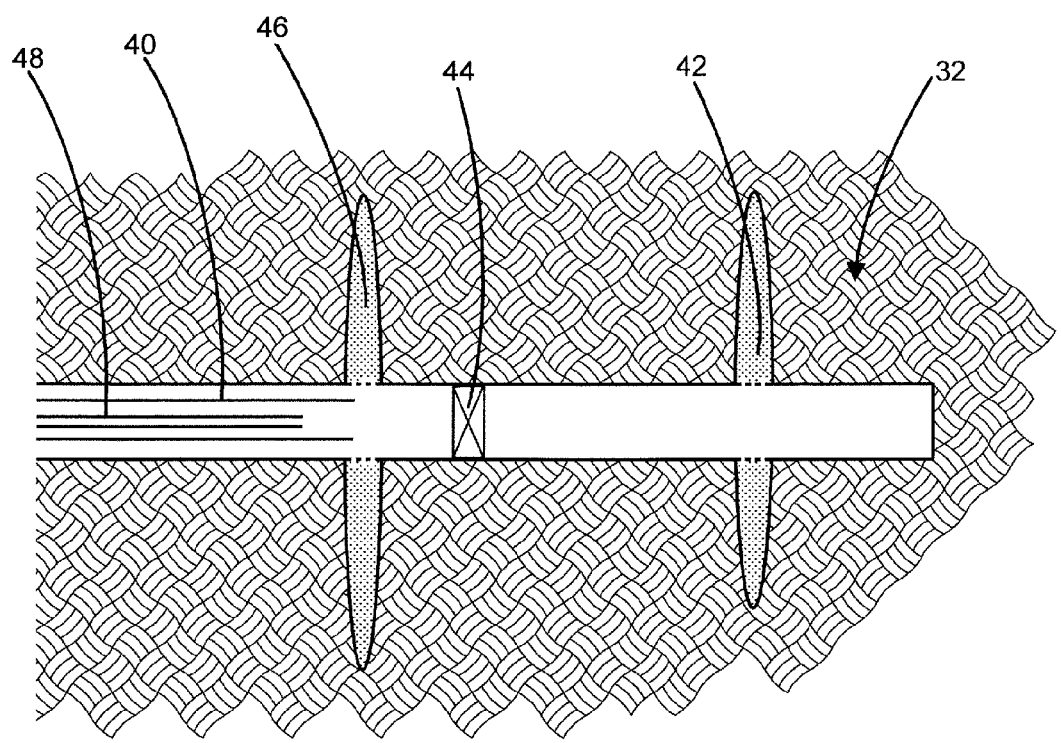
FIG. 6 illustrates fracturing from a horizontal wellbore.

FIG. 6 illustrates the use of tubing 40, which may be coiled tubing, to form fractures within a horizontal wellbore. As illustrated here, fracture 42 has already been formed and has been closed off by a temporary plug 44. Fracture 46 is being formed. In a manner generally similar to the arrangement of FIG. 5, water, friction reducing polymer, a small quantity of oil and the mixed particulate materials are supplied under pressure through tubing 40. Pressurized nitrogen is supplied along smaller tubing 48. Agglomerates form as nitrogen gas exits from the tubing 48, and the flow of carrier liquid delivers these into the fracture 46 which extends both upwards and downwards from the wellbore.

The invention claimed is:

1. A method of delivering particulate material below ground, comprising supplying, underground, a fluid composition comprising an aqueous carrier liquid in which there are suspended at least two materials which are hydrophobic particles, where a first one of these materials has a higher specific gravity than a second one, the fluid also comprising a gas wetting the surface of the particles of the materials and binding the particles together such that agglomerates of the particles held together by the gas are present below ground.

2. A method according to claim 1 wherein the first material also has a higher strength to resist crushing than does the second material.

3. A method according to claim 1 including delivering the composition via a well bore to a subterranean location.

4. A method according to claim 3 which is a method of hydraulic fracturing, the composition being a fracturing fluid pumped under pressure down the wellbore to cause fracturing of a subterranean formation and the first material being a proppant to keep open a porous flow path within the fracture.

5. A method according to claim 1 wherein the particles of the first material have a specific gravity of at least 1.8 and the particles of the second material have a specific gravity of less than 1.5.

6. A method according to claim 1 wherein the ratio of the first and second materials lies in a range from 4:1 to 1:4 by volume.

7. A method according to claim 1 wherein the particles of the first material have a hydrophobic surface coating.

8. A method according to claim 1 wherein the second material is intrinsically hydrophobic.

9. A method according to claim 1 wherein the second material comprises hollow particles with a hydrophobic exterior.

10. A method according to claim 1 wherein the second material comprises hollow glass particles with a hydrophobic surface coating.

11. A method according to claim 1 wherein the gas and/or the particulate materials are delivered via the wellbore in such a manner as to prevent agglomeration within the wellbore but allow agglomeration to take place at the subterranean location.

12. A method according to claim 1 wherein the gas is transported down the wellbore separately from the at least two materials so that they contact each other downhole.

13. A method according to claim 1 including a step of generating agglomerating gas at the subterranean location.

14. A method of fracturing a subterranean reservoir formation penetrated by a wellbore, comprising delivering a fracturing fluid via a well bore to the fracture, said fracturing fluid providing within the fracture:
    an aqueous carrier liquid in which there are suspended at least two materials which are hydrophobic particles, where a first one of these materials has a higher specific gravity than a second one, the fluid also comprising a gas as an agglomerating agent wetting the surface of the particles and binding the particles together such that agglomerates of the particles held together by the agglomerating agent are present within the fracture.

15. A method according to claim 14 wherein the permeability of the reservoir formation does not exceed 10 millidarcies.

16. A method according to claim 14 wherein the gas is air or nitrogen.

* * * * *